United States Patent
Oshima et al.

(10) Patent No.: US 6,204,301 B1
(45) Date of Patent: Mar. 20, 2001

(54) FLUOROPLASTIC COMPOSITES AND A PROCESS FOR PRODUCING THE SAME

(75) Inventors: Akihiro Oshima; Akira Udagawa; Yosuke Morita; Tadao Seguchi; Yoneho Tabata, all of Gunma-ken (JP)

(73) Assignee: Japan Atomic Energy Research Institute, Tokyo (JP)

( * ) Notice: Subject to any disclaimer, the term of this patent is extended or adjusted under 35 U.S.C. 154(b) by 0 days.

(21) Appl. No.: 09/395,213

(22) Filed: Sep. 14, 1999

(30) Foreign Application Priority Data

Dec. 17, 1998 (JP) .................................................. 10-359340

(51) Int. Cl.⁷ ................................ C08J 3/28; G21F 1/10; C08K 5/02
(52) U.S. Cl. ................................ 522/5; 522/71; 522/912; 523/136; 523/137; 524/463
(58) Field of Search .................................. 522/5, 71, 912; 523/136, 137; 524/463

(56) References Cited

U.S. PATENT DOCUMENTS 5,444,103 * 8/1995 Tabata et al. ............................. 522/5
5,700,417 * 12/1997 Fernyhough et al. ................. 522/71
5,985,949 * 11/1999 Seguchi et al. ....................... 522/912

OTHER PUBLICATIONS

Oshima et al., Radiation Processing For PTFE Composite Reinforced with Carbon Fiber, Proceeding RadTech Asia–99, 7th International Conference on Radiation Curing (Aug. 1999).

Oshima et al., Radiation–Induced Crosslinking of Short Fiber–filled Polytetrafluoroethylene (PTFE), Jaeri–Tech 99–012, Japan Atomic Energy Research Institute (Jan. 1999).

* cited by examiner

Primary Examiner—Tae Yoon
(74) Attorney, Agent, or Firm—Banner & Witcoff, Ltd.

(57) ABSTRACT

Fibers as a reinforcing substrate are impregnated with the particles of polytetrafluoroethylene and pressed into a shape at the melting point of polytetrafluoroethylene. Alternatively, the reinforcing substrate sandwiched between polytetrafluoroethylene sheets is pressed into a shape at the melting point of polytetrafluoroethylene. In either case, the shaped article is then exposed to an ionizing radiation in an oxygen-free atmosphere at the melting point of polytetrafluoroethylene. The inherent characteristics of the polytetrafluoroethylene, i.e., heat resistance, chemical resistance, abrasion resistance and lubricity, are retained and yet radiation resistance and resin transparency are imparted.

2 Claims, No Drawings

FLUOROPLASTIC COMPOSITES AND A PROCESS FOR PRODUCING THE SAME

BACKGROUND OF THE INVENTION

This invention relates to a process in which shaped articles using polytetrafluoroethylene (commercially available under the trade name "TEFLON") as the matrix of a fiber-reinforced plastic are treated by radiation-induced crosslinking to produce fiber-reinforced polytetrafluoro- ethylene shapes of high mechanical strength and high Young's modulus that retain the inherent characteristics of the matrix, i.e., heat resistance, chemical resistance, water repellency, abrasion resistance and lubricity, and which also exhibit radiation resistance and resin transparency.

Polytetrafluoroethylene is one of the outstanding plastics that have high resistance, chemical resistance, water repellency, lubricity and abrasion resistance.

Because of these features, both industrial and consumer uses of polytetrafluoroethylene have been expanding to cover various applications including packings, gaskets, tubes, insulation tapes, bearings and membranes as roofing materials for air domes.

However, polytetrafluoroethylene is highly susceptible to radiations and its mechanical characteristics deteriorate at exposure doses in excess of 1 kGy. Therefore, polytetrafluoroethylene cannot be used in radioactive environments as in nuclear facilities. As a further problem, polytetrafluoroethylene which is a crystalline polymer has low transmittance of light in the visible range and does not provide adequate lighting for the roofing membrane of an air dome that is made of polytetrafluoroethylene.

Efforts are being made to solve these problems by the radiation-induced crosslinking technique. However, commercial application of this idea to polytetrafluoroethylene shapes is difficult to realize due to the extensive deformation of the shapes. The only alternative is by crosslinking the particles of polytetrafluoroethylene with radiation and sintering them into a shape. Polytetrafluoroethylene has other problems: it has no suitable solvent in which it can be dissolved; it has lower tensile strength and Young's modulus than other resin materials; its melt viscosity is as high as $10^{11}$ P even at a temperature of 380° C.; it has low adhesion to glass and carbon fibers. For these reasons, polytetrafluoroethylene is not commonly used as the matrix of fiber-reinforced composites.

SUMMARY OF THE INVENTION

The present invention has been accomplished under these circumstances and is primarily intended to extend the use of polytetrafluoroethylene to the fields where it has found only limited practical utility.

Therefore, a first object of the invention is to provide a fiber-reinforced polytetrafluoroethylene composite that not only has sufficient radiation resistance to warrant its use in radioactive environments such as in nuclear facilities but also solves all of the related problems such as those with the mechanical characteristics of polytetrafluoroethylene as the matrix of the fiber- reinforced plastic and the light transparency of a membrane material made of the composite and which yet can be formed into a shape that exhibits these satisfactory properties while retaining its initial shape.

A second object of the invention is to provide a process for producing the fiber-reinforced polytetrafluoroethylene composite.

The fiber-reinforce polytetrafluoroethylene composite according to the first aspect of the invention can be produced by first impregnating the particles of polytetrafluoroethylene with reinforcing fibers, pressing them into a shape at the melting point of polytetrafluoroethylene and, then, exposing the reinforced powder to an ionizing radiation in the absence of oxygen at the melting point of polytetrafluoroethylene. Alternatively, a formed sheet of polytetrafluoroethylene is placed on both sides of a reinforcing fibrous substrate and pressed into a shape under the melting point of polytetrafluoroethylene. Subsequently, as in the first approach, the assembly is exposed to an ionizing radiation in the absence of oxygen under the melting point of polytetrafluoroethylene.

DETAILED DESCRIPTION OF THE INVENTION

The most common way to impregnate the fibers with polytetrafluoroethylene is either by immersing the fibers in a uniform dispersion of polytetrafluoroethylene powder or by applying it to the fibers. A dispersion medium that aids in effectively dispersing the polytetrafluoroethylene particles is a mixture of water with an emulsifier, alcohol, acetone or a mixture of alcohol and acetone or any other materials from which the skilled artisan who is familiar with dispersion media can select an appropriate combination to prepare the right type.

The particle size of the polytetrafluoroethylene powder is preferably in the range of 0.1–50 $\mu$m, provided that it is large enough to permit adequate impregnation between monofilaments of the fibers. The fibers thus impregnated with the polytetrafluoroethylene particles are subsequently air-dried or dried with hot air to remove the dispersion medium and the dried fibers may be immediately compressed in a temperature range of 300°–400° C., preferably between 327° C. which is the melting point of polytetrafluoroethylene crystal and 350° C., to produce a sintered shape.

The process for producing the fiber-reinforced composite of the invention can easily be implemented by placing the sintered shape in an oxygen-free atmosphere and exposing it to 200 kGy–20 MGy of an ionizing radiation as it is held again in the temperature range of 300–400° C., preferably between 327° C. which is the melting point of polytetrafluoroethylene crystal and 350° C. The most salient feature of the thus produced composite is that its matrix is a crosslinked polytetrafluoroethylene capable of retaining the initial shape. The fiber volume fraction of the composite, or the ratio of the fibers to the matrix, is adjustable as required either by controlling the powder concentration of the dispersion or the time of its impregnation or by repeating the impregnation and drying steps until the desired value is attained.

Using the dispersion of polytetrafluoroethylene powder is not the sole method of impregnating the fibers with polytetrafluoroethylene. Alternatively, the substrate fibers may be sandwiched between polytetrafluoroethylene sheets and the assembly is pressed to a shape in a temperature range of 300–400° C., preferably from 327° C. which is the melting point of polytetrafluoroethylene crystal to 350° C., followed by exposure of the shaped article to an ionizing radiation. The object of the invention can also be attained by this method. The thickness of the polytetrafluoroethylene sheets may be selected as appropriate for the thickness of the substrate fibers and one half of the latter may be given as a guide figure.

The ionizing radiation to be used in the invention may be selected from among electron beams, X-rays, neutron radiation and high-energy ions, taken either individually or in combination. For temperature control during exposure to ionizing radiations, either direct or indirect heat sources may be used, as exemplified by ordinary gas-circulating constanttemperature baths, or heaters or panel heaters. Alternatively, the heat generated by controlling the energy of electron beams from an electron accelerator may be directly used. The oxygen-free atmosphere as used in exposure to ionizing radiations includes not only vacuum but also atmospheric air that is purged with an inert gas such as helium or nitrogen. These oxygen-free atmospheres ensure against the suppression of the crosslinking reaction of polytetrafluoroethylene during exposure so that it will not undergo oxidative decomposition.

The fibers to used as a reinforcing substrate in the invention include glass fibers, carbon fibers, silicon carbide fibers, silicon nitride fibers, metal fibers and all other fibers that are used in conventional fiber-reinforced plastics which can withstand temperatures of 350° C. and above.

The following examples are provided for the purpose of further illustrating the present invention but are in no way to be taken as limiting.

EXAMPLE 1

In 100 parts of a dispersion medium consisting of water and an emulsifier, 60 parts of a polytetrafluoroethylene fine powder having an average size of 0.3 μm was dispersed. A plain-woven glass cloth was dipped in the resulting liquid, recovered from the liquid and dried. This procedure was repeated five times until 100 parts of the glass cloth was impregnated with 90 parts of the polytetrafluoroethylene fine powder. The glass cloth was then shaped by firing under pressure at 340° C., transferred into an irradiation vessel filled with a nitrogen gas atmosphere and exposed to 500 kGy of electron beams at 340° C. The irradiated article retained the initial shape. When subjected to a tensile test, the article was found to have experienced marked improvements in strength, as shown in Table 1 below.

TABLE 1

Results of Tensile Test on
Glass Fiber Reinforced PTFE

|  | At 45° | In warp direction |
| --- | --- | --- |
| Glass/non-crosslinked PTFE | 55.1 MPa | 679.8 MPa |
| Glass/PTFE crosslinked to 500 KGy | 250.2 MPa | 963.9 MPa |

EXAMPLE 2

Samples prepared by the same method as in Example 1 were exposed to radiation at room temperature either in vacuum or in atmospheric air. Those samples were compared for radiation resistance in terms of the dose required for the strength as determined in the tensile test to drop to one half the initial value. Satisfactory results were obtained as shown in Table 2 below.

TABLE 2

Results of Comparison of Radiation Resistance

|  | In vacuum | In atmospheric air |
| --- | --- | --- |
| Glass/non-crosslinked PTFE | 0.005 MGy (5 kGy) | 0.004 MGy (4 kGy) |
| Glass/PTFE crosslinked to 500 kGy | 7.2 MGy | 1.6 MGy |

EXAMPLE 3

A sample 100 μm thick was prepared by the same method as in Example 1 and its light transmittance was measured with a visible spectrophotometer at wavelengths of 200–900 nm. It had a transmittance of 75% at 400 nm and could transmit 90% or more of the light at wavelengths of 600 nm and longer.

EXAMPLE 4

In 100 parts of a dispersion medium consisting of water and an emulsifier, 50 parts of a polytetrafluoroethylene powder having a particle size of 0.6 μm was dispersed. Thirty continuous filaments of carbon fiber (T300 of Toray Industries, Inc.) were dipped in the resulting liquid, recovered from it and dried. This procedure was repeated until 100 parts of the carbon fiber filaments were impregnated with 100 parts of the polytetrafluoroethylene fine powder. The filaments were then shaped by firing at 340° C. under pressure, transferred into an irradiation vessel filled with a helium gas atmosphere and exposed to 500 kGy or 1 MGy of electron beams. The irradiated article retained its initial shape.

When subjected to a three-point bending test, it was found to have experienced marked improvements in strength as shown in Table 3 below.

TABLE 3

Results of Three-Point Bending Test
on Carbon Fiber Reinforced PTFE

|  | Bending strength | Bending Modulus |
| --- | --- | --- |
| Carbon/non-crosslinked PTFE | 51.3 MPa | 13.6 GPa |
| Carbon/PTFE crosslinked to 500 kGy | 314.4 MPa | 53.7 GPa |
| Carbon/PTFE crosslinked to 1 MGy | 369.6 MPa | 52.9 MPa |

EXAMPLE 5

Samples prepared by the same method as in Example 4 were exposed to radiation at room temperature either in vacuum or in atmospheric air. Those samples were compared for radiation resistance in terms of the dose required for the bending strength as determined by the three-point bending test to drop to 70% of the initial value. Satisfactory results were obtained as shown in Table 4 below.

TABLE 4

Results of Comparison of
Radiation Resistance

|  | In vacuum | In atmospheric air |
| --- | --- | --- |
| Carbon/non-crosslinked PTFE | 0.01 MGy (10 kGy) | 0.008 MGy (8 kGy) |
| Carbon/PTFE crosslinked to 500 kGy | 12.4 MGy | 2.9 MGy |
| Carbon/PTFE crosslinked to 1 MGy | 18.6 MGy | 4.1 MGy |

EXAMPLE 6

Samples 10 mm thick were prepared by the same method as in Example 4 and measured for friction and abrasion coefficients using a thrusting friction/abrasion tester according JIS K7218, in which a cylindrical ring of SUS 304 (o.d. 25.6 mm; i.d. 20.6 mm) was urged against the sample to give a pressure of 2.5 kg/cm$^2$ and slid at a speed of 0.5 m/s. The results are shown in Table 5; the samples not only had low friction coefficients leading to good lubricating properties but also exhibited high abrasion resistance.

TABLE 5

Results of Friction/Abrasion Test on Carbon Fiber Reinforced PTFE

|  | Friction coefficient | Abrasion coefficient |
|---|---|---|
| PTFE | 0.21 | Abnormal abrasion |
| Carbon/PTFE crosslinked to 500 kGy | 0.18 | 0.14 |
| Carbon/PTFE crosslinked to 1 MGy | 0.17 | 0.13 |

EXAMPLE 7

In 100 parts of a dispersion medium consisting of water and an emulsifier, 60 parts of a polytetrafluoroethylene fine powder having an average size of 9.0 μm was dispersed. A mesh of metal fiber (SUS 304) was coated with the resulting liquid and dried. This procedure was repeated five times until 100 parts of the metal fiber was impregnated with 150 parts of the polytetrafluoroethylene fine powder. The mesh was then fired at 350° C., transferred into an irradiation vessel filled with an argon gas Atmosphere and exposed to 300 kGy of electron beams at 340° C. The irradiated mesh retained the initial shape. When subjected to a tensile test, the mesh was found to have experienced marked improvements in strength, as shown in Table 6 below.

TABLE 6

Results of Tensile Test on Metal Fiber Reinforced PTFE

|  | At 45° | | In warp direction | |
|---|---|---|---|---|
|  | yield strength | Young's modulus | yield strength | Young's modulus |
| Metal/non-crosslinked PTFE | 79.0 MPa | 310.5 MPa | 95.8 MPa | 2.59 MPa |
| Metal/PTFE crosslinked to 300 kGy | 105.5 MPa | 386.4 MPa | 127.6 MPa | 3.28 MPa |

EXAMPLE 8

A plain-woven glass fiber cloth was sandwiched between polytetrafluoroethylene sheets 100 μm thick (G192 of Asahi Glass Co., Ltd.) and pressed into a shape at 350° C. The shaped article was transferred into an irradiation vessel filled with a nitrogen gas atmosphere and exposed to 300 kGy of electron beams at 340° C. The irradiated article retained the initial shape. When subjected to a tensile test, the article was found to have experienced marked improvements in strength, as shown in Table 7 below.

TABLE 7

Results of Tensile Test on Glass Fiber Reinforced PTFE

|  | At 45° | In warp direction |
|---|---|---|
| Glass/non-crosslinked PTFE | 54.8 MPa | 659.2 MPa |
| Glass/PTFE crosslinked to 300 kGy | 213.8 MPa | 835.3 MPa |

EXAMPLE 9

Samples prepared by the same method as in Example 8 were exposed to radiation at room temperature either in vacuum or in atmospheric air. Those samples were compared for radiation resistance in terms of the dose required for the strength as determined in the tensile test to drop to one half the initial value. Satisfactory results were obtained as shown in Table 9 below.

TABLE 9

Results of Comparison of Radiation Resistance

|  | In vacuum | In atmospheric air |
|---|---|---|
| Glass/non-crosslinked PTFE | 0.005 MGy (5 kGy) | 0.004 MGy (4 kGy) |
| Glass/PTFE crosslinked to 300 kGy | 5.9 MGy | 1.3 MGy |

According to the present invention, a shaped article comprising the matrix polytetrafluoroethylene reinforced with fibers undergoes a radiation-induced crosslinking reaction at the melting point of polytetrafluoroethylene as it is supported by the substrate fibers; therefore, the irradiated article has no wrinkles or other deformations but retains its initial shape. The polytetrafluoroethylene that has been crosslinked in the presence of the filler fibers not only forms a morphologically continuous layer but also presents with high mechanical strength and modulus, contributing to enhance the reinforcing effect of the substrate fibers.

What is claimed is:

1. A process of producing a fiber reinforced composite comprising:

immersing one or more continuous or short fibers selected from the group consisting of glass fiber, carbon fiber, silicon carbide fiber, aramid fiber, and metal fiber, in a uniform dispersion of polytetrafluoroethylene powder; wherein said dispersion comprises a dispersion medium;

drying the fibers to remove the dispersion medium;

compressing the dried fibers at a temperature of from about 327° C. to about 350° C. to produce a sintered shape; and placing the sintered shape in an oxygen-free atmosphere and exposing the sintered shape to 200 kGy–20 MGy of an ionizing radiation while maintaining a temperature of from about 327° C. to about 350° C.

2. A process of producing a fiber reinforced composite comprising:

placing a formed sheet of polytetrafluoroethylene on first and second sides of a reinforcing fibrous substrate;

pressing the formed sheet and reinforcing fibrous substrate at a temperature of from about 327° C. to about 350° C. to produce a sintered shape; and placing the sintered shape in an oxygen-free atmosphere and exposing the sintered shape to 200 kGy–20 MGy of an ionizing radiation while maintaining a temperature of from about 327° C. to about 350° C.

* * * * *